United States Patent [19]

Tanaka

[11] 4,188,647
[45] Feb. 12, 1980

[54] CASSETTE TYPE TAPE RECORDER

[75] Inventor: Shinsaku Tanaka, Tokyo, Japan

[73] Assignee: Tanashin Denki Co., Ltd., Tokyo, Japan

[21] Appl. No.: 905,395

[22] Filed: May 12, 1978

[30] Foreign Application Priority Data

May 27, 1977 [JP] Japan .................................. 52-61871

[51] Int. Cl.$^2$ ........................ G11B 15/24; G1B 21/22
[52] U.S. Cl. ..................................... 360/105; 360/966
[58] Field of Search ............................ 360/105, 93–96, 360/96.1, 96.3, 96.5, 96.6; 242/198–200

[56] References Cited

U.S. PATENT DOCUMENTS

| | | | |
|---|---|---|---|
| 3,959,821 | 5/1976 | Nardino | 360/105 |
| 3,987,486 | 10/1976 | Ito | 360/105 |
| 4,014,041 | 3/1977 | Cicatelli | 360/96 |
| 4,021,005 | 5/1977 | Takemoto | 360/105 |
| 4,031,554 | 6/1977 | Umeda | 360/105 |
| 4,071,859 | 1/1978 | Sami | 360/105 |
| 4,115,826 | 9/1978 | Tagaki | 360/96 |

FOREIGN PATENT DOCUMENTS

2611565  3/1975  Fed. Rep. of Germany ........... 360/105

*Primary Examiner*—John H. Wolff
*Attorney, Agent, or Firm*—Bacon & Thomas

[57] ABSTRACT

A cassette type tape recorder, wherein, when a 2-reel type tape cassette is inserted in the lengthwise direction into a cassette-receiving section provided in a base board of a tape recorder, a push pin fixed on a drive mechanism-carrying board is depressed by the inserted tape cassette, causing the drive mechanism-carrying board to be lifted while being carried forward in the same direction as that in which the tape cassette is inserted into the cassette-receiving section; a reel drive shaft and capstan drive shaft mounted on the tape mechanism-carrying board are inserted into the tape cassette from below; one end portion of a magnetic head-carrying board fitted with a magnetic head and pinch roller is rotatably held by a magnetic head support pin fixed to the drive mechanism-carrying board; a cam pin provided at the other end of the magnetic head-carrying board is inserted into a cam hole obliquely bored in the base board of the tape recorder; and the magnetic head-carrying board is guided into the cam hole while being carried forward in the moving direction of the tape cassette as the result of the forward movement of the drive mechanism-carrying board and approaches the tape cassette, thereby causing the magnetic head and pinch roller to contact a magnetic tape received in the cassette.

1 Claim, 14 Drawing Figures

CASSETTE TYPE TAPE RECORDER

BACKGROUND OF THE INVENTION

This invention relates to a cassette type tape recorder which comprises a base board; a cassette-receiving section formed in the base board; a drive mechanism including a reel drive shaft, capstan drive shaft, and motor for driving these shafts; a drive mechanism-carrying board which is fitted with the drive mechanism and disposed below the base board, and, when a 2-reel type tape cassette is lengthwise inserted into the cassette-receiving section, is lifted while being carried forward in the direction in which the tape cassette is inserted into the cassette receiving section and simultaneously with said insertion; a magnetic head-carrying board set on the base board; and a magnetic head and pinch roller mounted on the magnetic head-carrying board and designed to contact the magnetic tape received in the tape cassette when the magnetic head-carrying board approaches the tape cassette.

Figure 1:
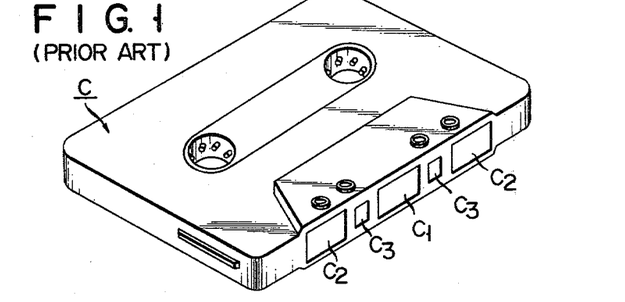
FIG. 1 is an oblique view of the ordinary 2-reel type tape cassette.

FIG. 1 shows a 2-reel type tape cassette C. as is well known, this tape cassette C has a rectangular form. One lengthwise side wall of the tape cassette C is provided with a plurality of openings. The central opening $C_1$ is used to insert a magnetic head. Set on both sides of the central magnetic head opening $C_1$ are a pair of openings $C_2$ for insertion of a pinch roller. Two openings $C_3$ for insertion of a detection lever are formed between the central opening $C_1$ and the adjacent pinch roller openings $C_2$.

With the conventional tape recorder using the above-mentioned 2-reel type tape cassette, a drive mechanism carrying board is located below a base board in which a cassette-receiving section is formed. As previously mentioned, the drive mechanism is formed of a reel drive shaft, capstan drive shaft and motor for driving these shafts. The tape cassette is crosswise inserted into the cassette-receiving section. When inserted, the tape cassette pushes the drive mechanism-carrying board, causing the reel drive shaft and capstan drive shaft to be inserted into the tape cassette from below. A tape cassette constructed as described above is referred to as "the Staar type". However, this Staar type tape recorder has the drawbacks that since the rectangular tape cassette is inserted crosswise into the cassette-receiving section with the openings $C_1$, $C_2$, $C_3$ kept on the forward side of said tape cassette as sewed in the direction of said insertion, causing the tape recorder to have a lengthy frontage and consequently a large size as a whole.

For elimination of the above drawbacks, there has recently been proposed a tape recorder, which allows a tape cassette to be inserted in the cassette-receiving section in the lengthwise direction with the openings $C_1$, $C_2$, $C_3$ kept on one of the crosswise sides of the tape recorder. With a prior art tape recorder of this type, the magnetic head-carrying board was moved in a direction perpendicular to that in which the tape cassette was inserted into and taken out of the cassette-receiving section. After inserted, the magnetic head-carrying board approached the tape cassette to cause the magnetic head and pinch roller to contact a magnetic tape received in the tape cassette. Consequently, it was impossible to carry out both the insertion of the tape cassette and the movement of the magnetic head-carrying board at the same time, thus making it necessary to provide a complicated interlocking mechanism to attain the simultaneous occurrence of both above-mentioned operations. Where the tape cassette was removed from the cassette-receiving section, the magnetic head-carrying board had to be shifted in advance in a direction opposite to that in which the tape cassette was inserted. Therefore, automatic withdrawal of the tape cassette was undesirably accompanied with intricate mechanism.

Summary of the Invention

It is accordingly the object of this invention to provide a cassette type tape recorder comprising a base board; a cassette-receiving section formed in the base board; a drive mechanism including a reel drive shaft, capstan drive shaft and motor for driving these shafts; a drive mechanism-carrying board which is provided with the drive mechanism and disposed below the base board of the tape recorder, and, when the 2-reel type tape cassette is inserted into the cassette-receiving section in the lengthwise direction, is lifted while being carried forward in the direction in which the tape cassette is inserted into the cassette-receiving section and simultaneously with said insertion, causing the reel drive shaft and capstan drive shaft to be inserted into the tape cassette from below; a magnetic head-carrying board; and a magnetic head and pinch roller mounted on the magnetic head-carrying board and designed to contact a magnetic tape received in the tape cassette when the magnetic head-carrying board approaches the tape cassette, the improvement being that the insertion of the tape cassette and the movement of the magnetic head-carrying board can be effected at the same time by simple mechanism; and the tape cassette can be automatically taken out of the cassette-receiving section by simple mechanism.

To attain the above-mentioned object, the magnetic head-carrying board approaches the tape cassette while being carried forward in the direction in which the tape cassette is inserted and simultaneously with said insertion. During the insertion of the tape cassette into the cassette-receiving section, the magnetic head and pinch roller are made to contact a magnetic tape received in the cassette.

The magnetic head-carrying board is rotatably supported at one end by a support pin fixed to the drive mechanism-carrying board. A cam pin fitted to the other end of the magnetic head-carrying board is inserted into a cam hole obliquely formed in the base board of the tape recorder. The magnetic head-carrying board is guided into the cam hole, while being carried forward in the direction in which the tape cassette is inserted and simultaneously with said insertion, and approaches the tape cassette, causing the magnetic head and pinch roller to conact a magnetic tape received in the tape cassette.

BRIEF DESCRIPTION OF THE DRAWINGS

FIGS. 2 to 12 represent the cassette type tape recorder of the invention: FIGS. 13 and 14 jointly set forth a cassette type tape recorder according to another embodiment of this invention.

DESCRIPTION OF THE PREFERRED EMBODIMENTS

There will now be described the preferred embodiments of this invention by reference to the accompanying drawings.

Figure 2:
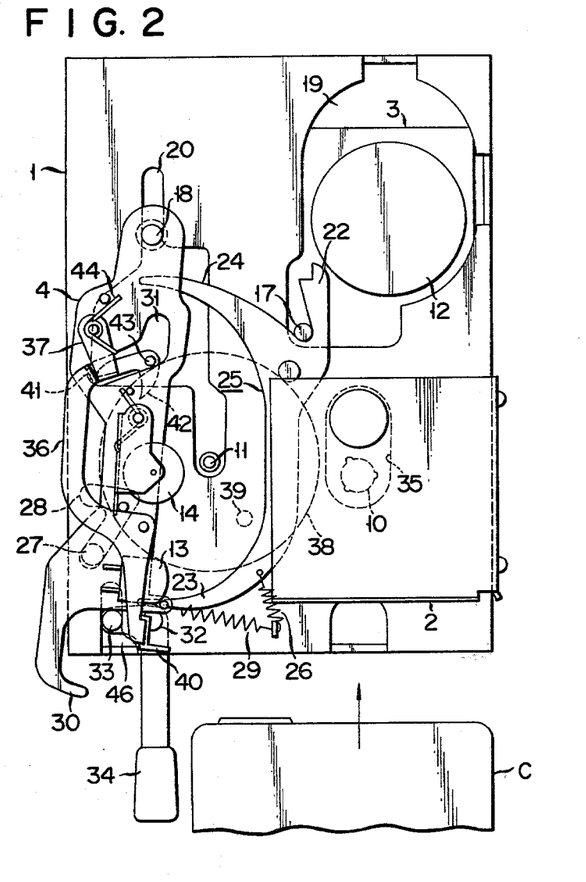
FIG. 2 is a plan view of the tape recorder of the invention before a tape cassette is inserted thereinto.
Figure 3:
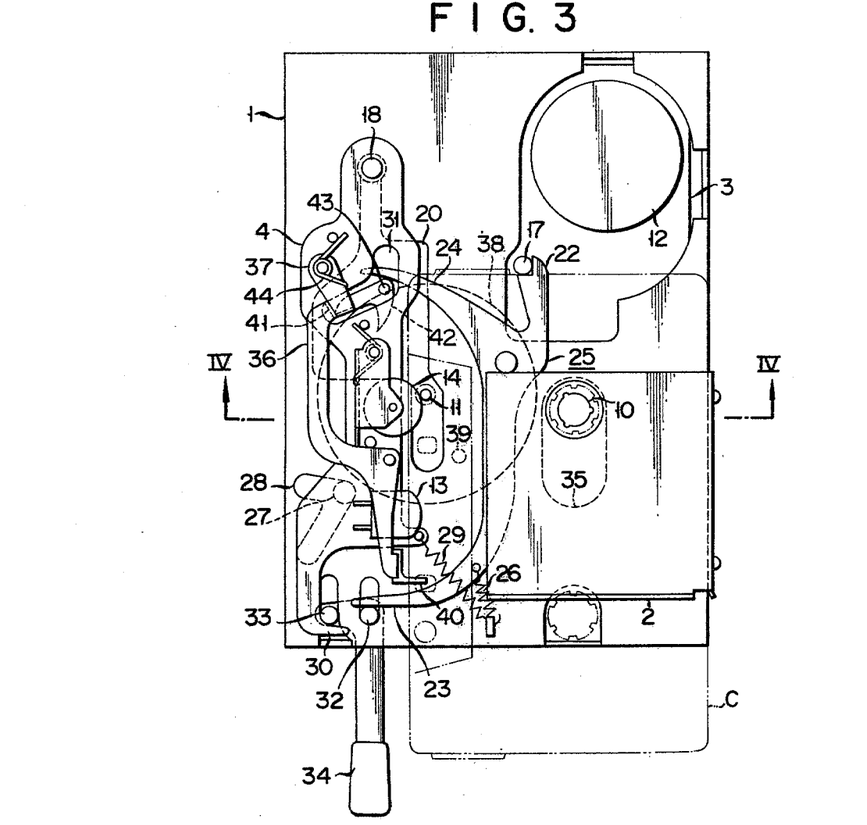
FIG. 3 is a plan view of said tape recorder after insertion of the tape cassette thereinto.
Figure 4:
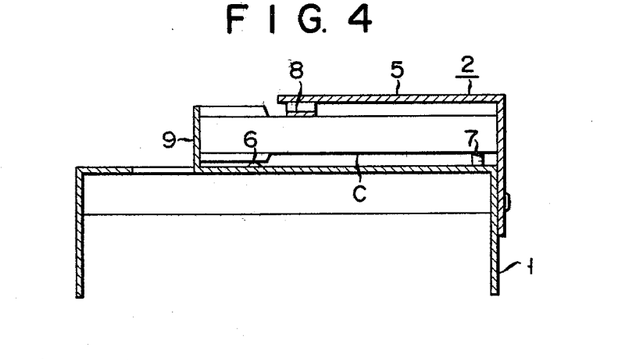
FIG. 4 is a section view on line IV—IV of FIG. 3.

Description is first given of the embodiment shown in FIGS. 2 to 12. FIG. 2 is a plan view of a tape recorder before a tape cassette C is inserted thereinto, and FIG. 3 is a plan view of the tape recorder after said insertion. Referential numeral 1 denotes a base board of the tape recorder; 2 a cassette-receiving section formed in the upper wall of the base board 1; 3 a drive mechanism-carrying board disposed on the underside of the base board 1; and 4 a magnetic head-carrying board mounted on the upper surface of the base board 1. As shown in FIG. 4, the cassette-receiving section 2 comprises an L-shaped board 5, one member of which is screwed to the right side wall of the base board 1; support projections 6, 7 for holding the tape cassette C from below; a plate spring 8 pressing the tape cassette C from above; and a positioning device for defining the horizontal position of the tape cassette C. The tape cassette C is inserted in the lengthwise direction into the cassette-receiving section 2 with the openings $C_1$, $C_2$ of the tape cassette C kept on the left side thereof.

A drive mechanism comprising a reel drive shaft 10, capstan drive shaft 11 and motor 12 for driving these shafts 10, 11 is mounted on the drive mechanism-carrying board 3. The magnetic head-carrying board 4 is fitted with a magnetic head 13, and pinch roller 14.

There will now be described by reference to FIGS. 5 to 9 the manner in which the drive mechanism-carrying board 3 and magnetic head-carrying board 4 are fitted to the base board 1 and the operations of these boards 3, 4.

Figure 5:
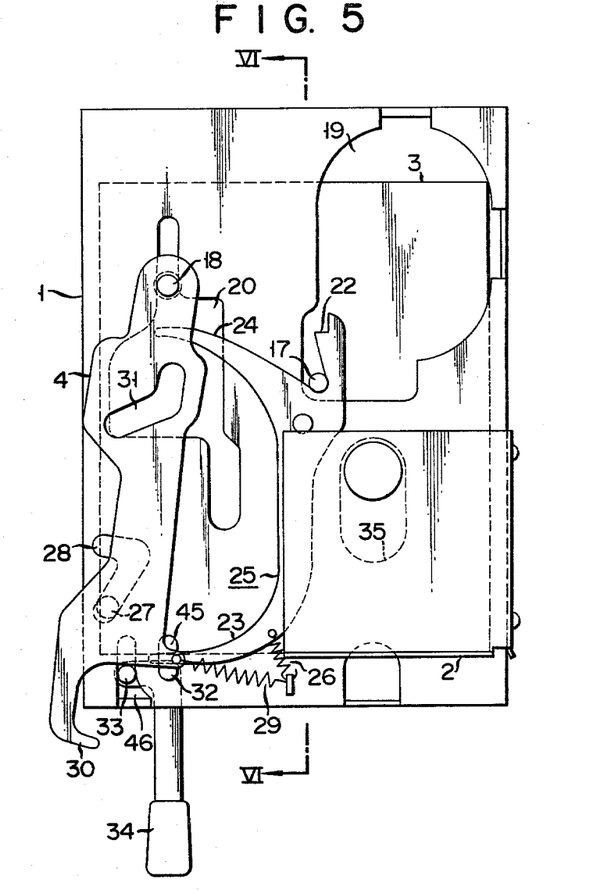
FIG. 5 is a plan view showing the relative positions of a drive mechanism-carrying board and a magnetic head-carrying board before insertion of the tape cassette.
Figure 6:
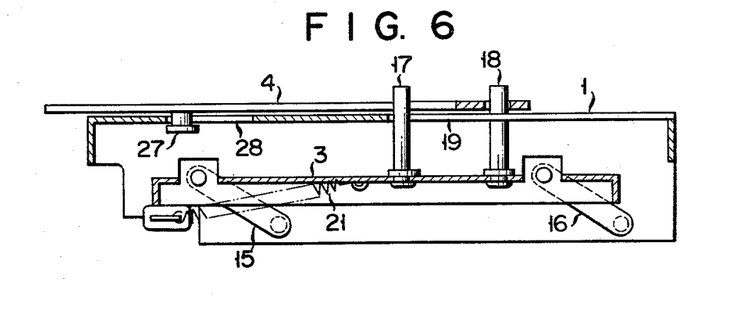
FIG. 6 is a sectional view on line VI—VI of FIG. 5.

As seen from FIG. 6, the right and left end portions of the drive mechanism-carrying board 3 are swingably fitted to the right and left side end portions of the substrate 1 by means of the corresponding links 16, 15. A press pin 17 and magnetic head support pin 18 are erected on the upper surface of the drive mechanism-carrying board 3. The pins 17, 18 project above the upper surface of the base board 1 through pin holes 19, 20 (FIG. 5) bored in the substrate 1. The drive mechanism-carrying board 3 is urged toward the front side of the base board 1, namely, in the direction in which the tape cassette C is removed from the cassette-receiving section 2 by a spring 21 obliquely stretched between said drive mechanism-carrying board 3 and base board 1. Where the press pin 17 is depressed by the tape cassette C inserted into the cassette-receiving section 2, then the drive mechanism-carrying board 3 is lifted by means of the links 15, 16 while being carried forward in the direction in which the tape cassette C is inserted into the cassette-receiving section 2 and simultaneously with said insertion and approaches the base board 1 as shown in FIG. 8. An engagement lever 25 provided with three arms 22, 23, 24 is rotatably mounted on the upper surface of the base board 1. When the drive mechanism-carrying board 3 is set in the position indicated in FIG. 8, then one arm 22 of the engagement lever 25 engages the press pin 17 (FIG. 7) to hold the drive mechanism-carrying board 3 in a lifted position. The engagement lever 25 is urged counterclockwise by the spring 26.

The magnetic head support pin 18 penetrates the forward end portion of the magnetic head-carrying board 4 (FIG. 7) and causes said magnetic head-carrying board 4 to travel in the direction in which the tape cassette C is inserted into or removed from the cassette-receiving section 2 according to the direction of the movement of the drive mechanism-carrying board 3. A cam pin 27 is projectively provided on that part of the underside of the magnetic head-carrying board 4 which lies near the rear end thereof. This cam pin 27 is inserted into a cam hole 28 bored in the base board 1. The cam hole 28 is inclined to the right as viewed in the direction in which the tape cassette C is inserted into the cassette-receiving section. The cam hole 28 is further bent to the left at the forward end, thus taking a dog-legged form. A spring 29 is obliquely stretched between the magnetic head-carrying board 4 and the base board 1, causing the cam pin 27 to be elastically pressed against the right side edge of the cam hole 28. The rear end portion of the magnetic head-carrying board 4 is provided with a slidably engaging portion 30. A through hole 31 is bored in the proximity of the forward end of the magnetic head-carrying board 4 to communicate with the through hole 20 of the base board 1. Where, therefore, the tape cassette C is inserted into the cassette-receiving section 2, and the drive mechanism-carrying board 3 travels in the direction in which the tape cassette C is inserted into the cassette-receiving section 2, then the magnetic head support pin 18 is moved in the same direction. Thus, the forward end portion of the magnetic head-carrying board 4, together with the support pin 18, moves in the direction in which the tape cassette C is inserted into the cassette-receiving section 2. The rear end portion of the drive mechanism-carrying board 4 is rotated to the right by slidable engagement between the cam pin 27 and cam hole 28, while said drive mechanism-carrying board 4 is carried forward in the direction in which the tape cassette C is inserted into the cassette-receiving section 2, and progressively approaches the tape cassette C (FIG. 7).

Figure 7:
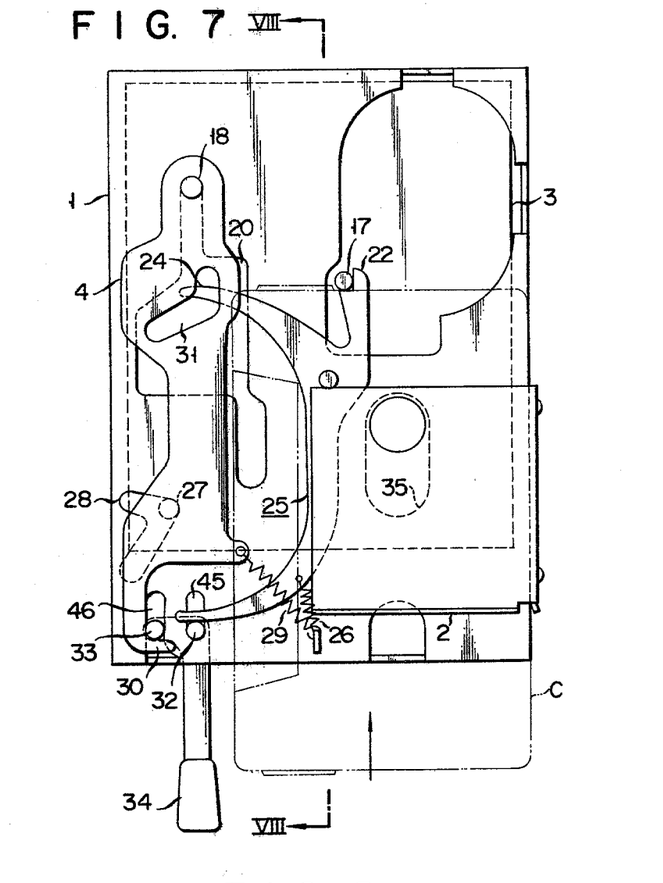
FIG. 7 is a plan view indicating the relative positions of a drive mechanism-carrying board and a magnetic head-carrying board.
Figure 8:
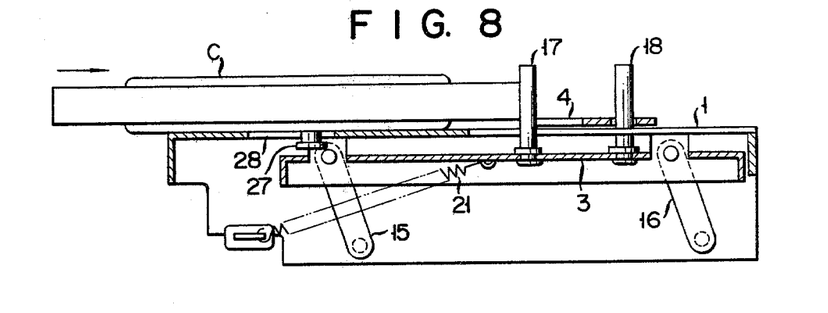
FIG. 8 is a sectional view on line VIII—VIII of FIG. 7.
Figure 9:
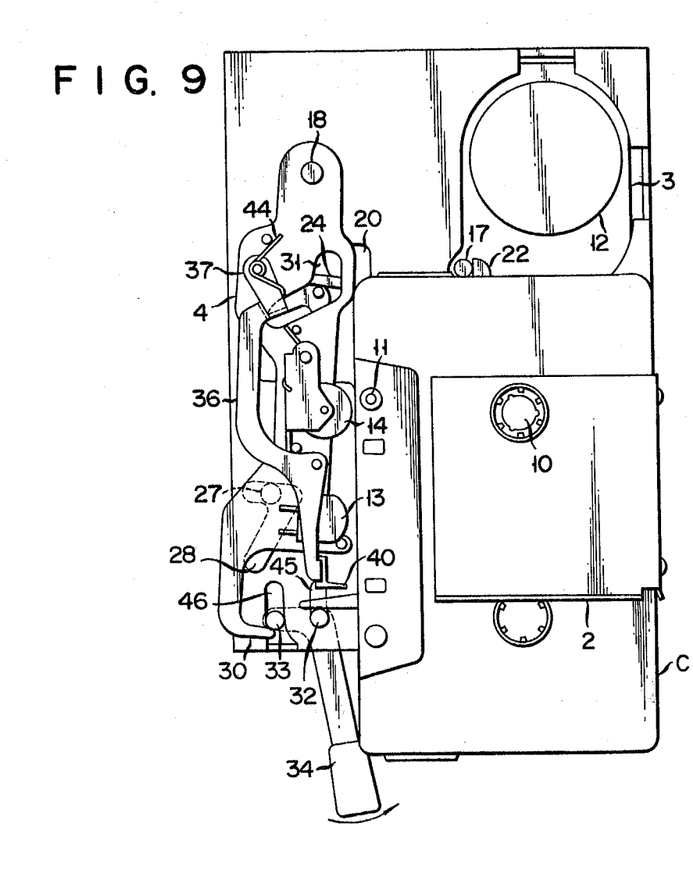
FIG. 9 is a plan view of the tape recorder when operated for the quick feed of a magnetic tape.

Mounted on the front part of the base board 1 is a release lever 34 having press pins 32, 33. One press pin 32 is inserted into a through hole 45 bored in the base board 1. The release lever 34 is made movable in the direction in which the tape cassette C is inserted into or taken out of the cassette-receiving section 2, and also rotatable about the press pin 32. The other press pin 33 of the release lever 34 and the slidably engaging portion 30 of the magnetic head-carrying board 4 constitute means for quick feeding of a magnetic tape. Said other pin 33 projects above the upper surface of the base board 1 through a penetrating hole 46. The forward end of the arm 23 of the engagement lever 25 is disposed ahead of the press pin 32. Where the release lever 34 is pushed forward under the condition of FIG. 7 in which the tape cassette C is inserted into the cassette-receiving section 2 and the press pin 17 engages the arm 22 of the engagement lever 25, then the press pin 32 presses the arm 23 of the engagement lever 25, causing the engagement lever 25 to be rotated against the force of the spring 26. Since, at this time, the arm 22 is disengaged from the press pin 17, the drive mechanism-carrying board 3 regains the original position indicated in FIGS. 5 and 6 by the force of the spring 21. At the return of the drive mechanism-carrying board 3, the tape cassette C is pushed backward by the press pin 17 in the direction in which said tape cassette C is drawn out. When the drive mechanism-carrying board 3 is brought back to the original position, then the magnetic head-carrying board 4 is pushed backward by the magnetic head support pin 18. At this time, the rear end portion of the magnetic head-carrying board 4 is rotated to the left by slidable engagement between the cam pin 27 and cam hole 28 to be set apart from the tape cassette C.

Where the release lever 34 is rotated to the right while the magnetic head-carrying board 4 occupies the position of FIG. 7, then the press pin 33 revolves around the press pin 32 to press the slidably engaging portion 30 of the magnetic head-carrying board 4. As the result, the magnetic head-carrying board 4 is rotated to the left about the support pin 18, causing the magnetic head 13 and pinch roller 14 to be set apart from a magnetic tape received in the cassette C (FIG. 9).

The drive mechanism-carrying board 3 and magnetic head-carrying board 4 are moved, as mentioned above, at the same time as the insertion and withdrawal of the tape cassette C. At this time, the reel drive shaft 10, capstan drive shaft 11, magnetic head 13 and pinch roller 14 are operated as described below. The drive mechanism-carrying board 3 is set in a lower position as shown in FIGS. 2, 5 and 6, before the tape cassette C is inserted into the cassette-receiving section 2. At this time, the reel drive shaft 10 and capstan drive shaft 11 are held below the passage through which the tape cassette C is inserted. The magnetic head 13 and pinch roller 14 are kept on the left side of said passage. Where the tape cassette C is inserted into the cassette-receiving section 2, then the drive mechanism-carrying board 3 is lifted, while being carried forward in the direction in which the tape cassette C is inserted into the cassette-receiving section 2 and simultaneously with said insertion, causing the reel drive shaft 10 and capstan drive shaft 11 to be brought into the tape cassette C through the holes 35, 20 bored in the base board 1. The magnetic head-carrying board 4 is gradually rotated to the right while being carried forward in the direction in which the tape cassette C is inserted into the cassette-receiving section 2 and simultaneously with said insertion, causing the magnetic head 13 and pinch roller 14 to be inserted into the tape cassette C through the openings $C_1$, $C_2$. When the tape cassette C is inserted up to the prescribed position, then the reel drive shaft 10 is inserted into the takeup reel of the tape cassette as shown in FIGS. 3, 7 and 8. The magnetic head 13 contacts a magnetic tape received in the tape cassette C. The capstan drive shaft 11 and pinch roller 14 clamp the magnetic tape from both sides. Where power is introduced into the motor 12 in response to the lifting of the drive mechanism-carrying board 3, then the motor 12 begins to be driven when the tape cassette C is set in the prescribed position. The motor 12 rotates the reel drive shaft 10 and capstan drive shaft 11, causing a magnetic tape to run in the prescribed direction for recording of sounds or reproduction thereof. Where the release lever 34 is turned to the right while the tape cassette C is still held in the cassette-receiving section 2, then the magnetic head-carrying board 4 is rotated to the left (FIG. 9). Therefore, the magnetic head 13 and pinch roller 14 are set apart from a magnetic tape received in the cassette C. The magnetic tape is rapidly taken up on the takeup reel by the rotation on the reel drive shaft 10, thus bringing about the so-called quick feed state. At this time, mere removal of the pinch roller 14 from the capstan drive shaft 11 accelerates the run of a magnetic tape. However, it is possible to increase the rotation of the reel drive shaft 10 by quickening the run of the motor 12 in interlocking relationship with the rightward rotation of the release lever 34 or the leftward rotation of the magnetic head-carrying board 4 or by applying a separately provided drive mechanism. Where the release lever 34 is pushed forward after being brought back to the original position, then the drive mechanism-carrying board 3 and magnetic head-carrying board 4 regain the position to remove the tape cassette C from the cassette-receiving section 2. At this time, the press pin 17 pushes back the tape cassette C. The reel drive shaft 10 and capstan drive shaft 11 fall below the passage through which the tape cassette C is inserted into the cassette-receiving section 2. The magnetic head 13 and pinch roller 14 are taken out of the openings $C_1$, $C_2$ of the tape cassette C. Therefore, the inward push of the release lever 34 leads to the above-mentioned operations, enabling the tape cassette C to be easily withdrawn from the cassette-receiving section 2.

Figure 10:
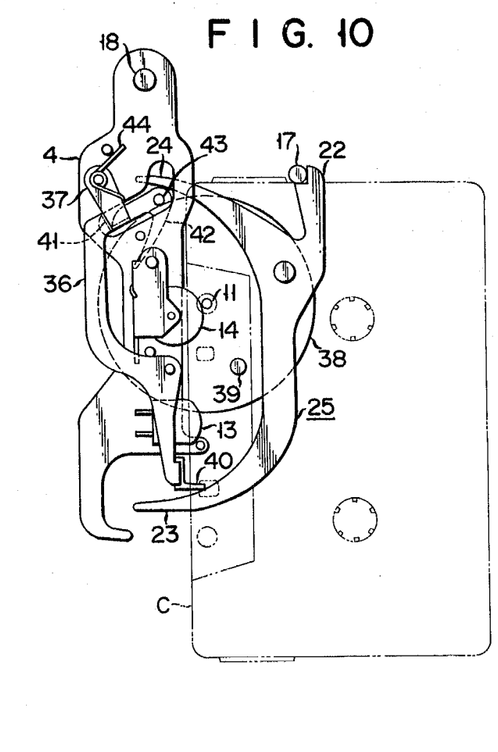
FIG. 10 is a plan view of an object device before put into operation.
Figure 11:
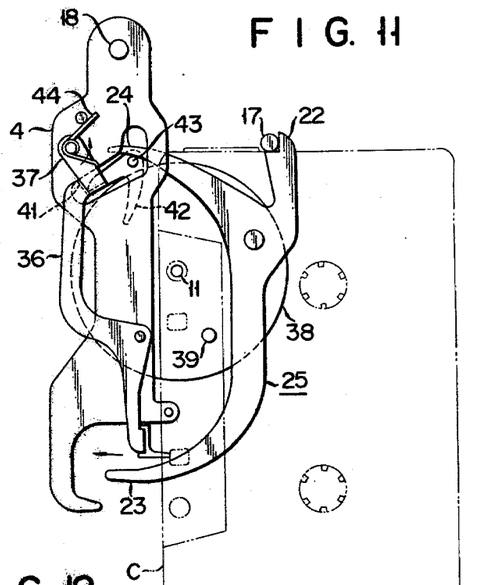
FIG. 11 is a plan view of the eject device just ready for operation.
Figure 12:
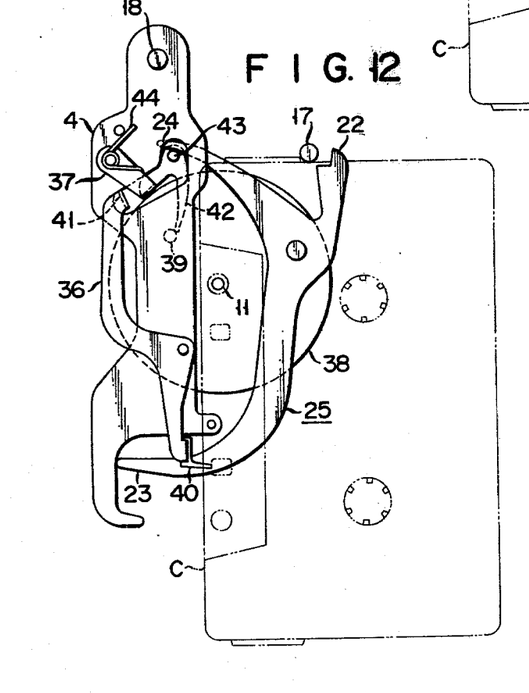
FIG. 12 is a plan view of the eject device while being operated.

The tape recorder of this invention is provided with an eject device which, when a tape wound about a feed reel runs out, is designed automatically to stop the feed of the tape and push back the tape cassette C. This eject device comprises a horizontally rotatable tape tension-detecting lever 36, engagement pin 39 projectively provided on the upper surface of a flywheel 38 integrally formed with the capstan shaft 11, and the arm 24 of the engagement lever 25. The tape tension-detecting lever 36 is pivoted at the center to the magnetic head-carrying board 4, and is provided at one end with a detection means 40, and at the other end with a downward bent member 41. One end portion of the engagement lever 37 is pivoted to the magnetic head-carrying board 4. The other end portion of said engagement lever 37 passes through the hole 31 of the magnetic head-carrying board 4 and the hole 20 of the base board 1 and horizontally extends along the underside of the base board 1. The tip of said other end portion is formed into an engagement pawl 42. A release pin 43 is projectively set on the upper surface of the engagement pawl 42. The engagement lever 37 is urged by a spring 44 for clockwise rotation as indicated in the drawing. The spring 44 presses the bent member 41 of the tape tension-detecting lever 36, causing said lever 36 to rotate counterclockwise. The arm 24 of the engagement lever 25 extends ahead of a release pin 43. The flywheel 38 is positioned below the drive mechanism-carrying board 3. That part of the drive mechanism-carrying board 3 which lies above the flywheel 38 is bored with a hole (not shown). Where the drive mechanism-carrying board 3 is lifted while being carried forward in the direction in which the tape cassete C is inserted into the cassette-receiving section 2, then the engagement pawl 42 of the engagement lever 37 passes through the hole of the drive mechanism-carrying board 3 to be positioned below said board 3. Where the magnetic head-carrying board 4 is rotated to the right, causing the magnetic head 13 and pinch roller 14 to enter the tape cassette C, then the detection member 40 of the tape tension-detecting lever 36 passes through the opening C₃ into the tape cassette C (FIG. 10). Therefore, a magnetic tape received in the cassette C is made to run in a state pressed and bent by the detection member 40. Where a tape wound about a feed reel is all taken up on a takeup reel, then the tape has its tension suddenly increased, because the terminal end of the tape is still held by the feed reel. Since the increased tensile force pushes back the detection member 40 outward, the tape tension-detecting lever 36 is slightly rotated. The bent member 41 of said lever 36 causes the engagement lever 37 to be rotated slightly against the force of the spring 44. Accordingly, the pawl 42 of the engagement lever 37 is shifted on to the revolution orbit of the engagement pin 39 (FIG. 11) to be pressed against the engagement pin 39. As the result, the engagement lever 37 makes a large rotation by the rotating moment of the flywheel 38 agains the force of the spring 44 (FIG. 12). The release pin 43 of the engagement lever 37 rotates the arm of the engagement lever 25 to cause the arm 22 thereof to be disengaged from the press pin 17. At this time, the drive mechanism-carrying board 3 is pulled by the spring 21 back to the original position to be taken out of the tape cassette C. Therefore, the reel drive shaft 10, capstan drive shaft 11, magnetic head 13, and pinch roller 14 are withdrawn out of the tape cassette C, which in turn is pushed back toward the user. The motor 12 is brought to rest upon the return of the drive mechanism-carrying board 3.

As described above, the tape recorder of this invention is designed such that the magnetic head support pin 18 erected on the drive mechanism-carrying board 3 penetrates the magnetic head-carrying board 4; both boards 3, 4 are moved in the direction in which the tape cassette C is inserted into and removed from the cassette-receiving section and simultaneously with said insertion or removal; the drive mechanism-carrying board 3 causes the reel drive shaft 10 and capstan drive shaft 11 to be inserted into or taken out of the tape cassette C, according as said drive mechanism-carrying board 3 enters or leaves the tape cassette C; the magnetic head-carrying board 4 causes the magnetic head 13 and pinch roller 14 to be brought into or released from the tape cassette C, according as said magnetic head-carrying board 4 enters or leaves the tape cassette C; and when the tape cassette C is inserted into or taken out of the cassette-receiving section 2, the magnetic head 10 and pinch roller 11 enter or leave the tape cassette C at the same time. The eject device described by reference to FIGS. 10 to 12 detects changes in the tension of a magnetic tape and releases the tape cassete C from the operation of recording or reproduction by one step.

Figure 13:
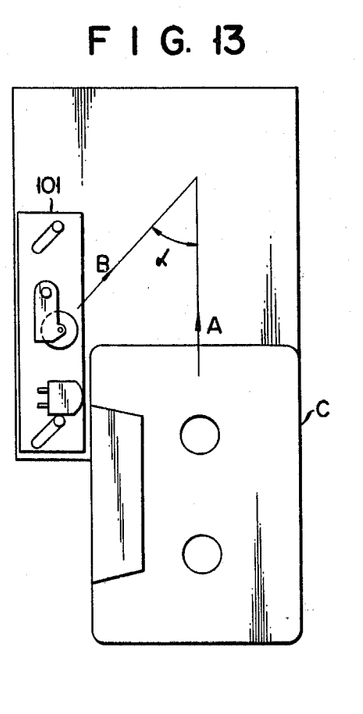
FIG. 13 is a plan view of the tape recorder before a tape cassette is inserted thereinto.
Figure 14:
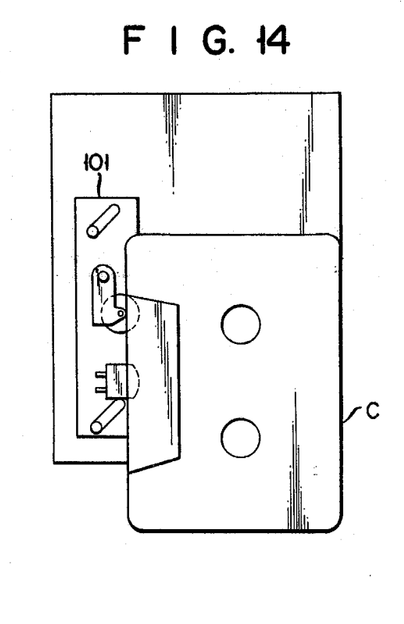
FIG. 14 is a plan view of the tape recorder after the insertion of the tape cassette thereinto.

It will be noted that this invention is not limited to the foregoing embodiment, but may be applicable in many other modifications. With the aforesaid embodiment, the forward part of the magnetic head-carrying board 4 was made to move parallel with the direction in which the tape cassette C was inserted into or taken out of the cassette-receiving section 2 and the rear part of the magnetic head-carrying board 4 was made to rotate to the right and left. As shown in FIGS. 13 and 14, however, the magnetic head-carrying board 101 may be moved in the direction B with a prescribed angle α of inclination defined with the direction A in which the tape cassette C is inserted into or removed from the cassette-receiving section 2. FIG. 13 shows the tape cassette C before inserted into the cassette-receiving section 2. FIG. 14 indicates the tape cassette after said insertion. The aforesaid embodiment refers to the case where only one reel drive shaft 10 was provided on a tape takeup side. Obviously, it is possible to use two reel drive shafts (on the takeup and feed sides respectively). This arrangement enables the tape cassette C to be loaded under a more stable condition. Where two reel drive shafts are provided, the feed reel drive shaft can be rotated to unwind a magnetic tape by mechanical or electrical switch means. The rotation of the feed reel drive shaft to unwind the magnetic tape can be effected by the leftward rotation of the release lever 34. Thus, ejection, stop, quick feeding and unwinding can all be carried out by a signal release lever 34, simplifying the arrangement and operation of a tape recorder.

What is claimed is:

1. A cassette type recorder comprising a base board having a cam hole extending at a specific angle to a tape-running direction; a cassette-receiving section disposed on the base board, into which a cassette is inserted in a direction parallel to the direction in which the tape housed in it is to run; a drive mechanism including reel drive shafts, a capstan drive shaft and a motor for driving the reel and capstan drive shafts; a drive mechanism-carrying board supporting the drive mechanism and disposed below the base board and provided with a support pin protruding upwardly, said drive mechanism-carrying board moving upwardly and forwardly when a 2-reel cassette is inserted into the cassette-receiving section, in the direction in which the cassette moves, thereby inserting the reel and capstan drive shafts into the cassette; and a magnetic head-carrying board supporting a magnetic head and pinch roller and having on one end portion a cam pin inserted in the cam hole of the base board, said magnetic head-carrying board moving in unison with the drive mechanism-carrying board in the direction in which the cassette is inserted into the cassette-receiving section and rotating about said support pin as the cam pin moves in the cam hole, thereby gradually rotating the magnetic head and pinch rollers into contact with the tape in the cassette; as the drive mechanism carrying board is pivoted upwardly and the reel and capstan drive shafts contact the cassette reels and tape, respectively.

* * * * *